July 2, 1963

M. E. REINECKE ETAL 3,095,746

FLUID-ACTUATED VALVE

Filed Feb. 15, 1960

INVENTORS
M.E. REINECKE
D. V. ECKERT
BY *Hudson & Young*
ATTORNEYS

INVENTORS
M.E. REINECKE
D.V. ECKERT
BY Hudson & Young
ATTORNEYS

United States Patent Office 3,095,746
Patented July 2, 1963

3,095,746
FLUID-ACTUATED VALVE
Marvin E. Reinecke and Donald V. Eckert, Bartlesville, Okla., assignors to Phillips Petroleum Company, a corporation of Delaware
Filed Feb. 15, 1960, Ser. No. 8,548
3 Claims. (Cl. 73—422)

This invention relates to a valve mechanism. In one aspect it relates to a fluid-actuated valve. In still another aspect this invention relates to a fluid-actuated diaphragm sampling valve for periodically supplying sample slugs to the columns of a chromatographic analyzer.

Gas chromatography is a known method of analyzing fluid samples by preferential sorption and desorption. In gas chromatography, a column containing appropriate sorbent, usually in granular form, is used to separate the various components of a fluid sample.

Conventionally, as the segregated constituents emerge from the sorbent-packed columns, they are suitably detected through the sensing of a characteristic property, such as thermal conductivity, density, refractive index, infrared adsorption, and the like, which detect the presence of the several components and measure the relative amounts thereof.

The desirability of using chromatography for such specific uses as fractionation (multi-stage distillation) control has been recognized for some time. Certain features of process chromatography, such as specific measurement, high sensitivity and simplicity of operation make this type of analyzer very attractive for use in automatic process control. There are, however, some apparently inherent features of chromatography which have appeared to be obstacles in adapting chromatography to widespread use in process control. The first of these features is the fact that the chromatographic analysis time is long. Ordinarily, analysis time cycles range from 10 to 30 minutes, which may be adequate for some purposes, but are often inadequate for close control of a process operation.

Another problem in high-speed chromatography is the manner of periodically directing a sample slug to a chromatographic analyzer with as little control mechanism as is possible. This is desired in order to increase the reliability of operation and achieve minimal volume between process stream being controlled and sensing device, thereby reducing the analysis time cycle to that required for close control of a process operation. Presently used sampling valves are actuated by motor shafts that require careful sealing and packing to avoid even the slight leaks from the valve chambers that would destroy the usefulness of such valves in high speed chromatography. Coincident with these older types of sample valve control are added space requirements, which are undesirable from the point of view of the analysis time cycle, as noted previously.

The present invention employs pneumatically-controlled diaphragms for opening and closing the ports of a sampling valve, which can now be miniaturized so as to permit three columns to be used in the space formerly occupied by a single column. This invention also eliminates the necesssity for motors, shafts and packings.

It is, therefore, an object of this invention to provide a sampling valve for use in a chromatographic analyzer, whereby the analysis time cycle can be reduced.

It is also an object to provide a fast response, small internal volume, fluid-actuated, diaphragm sampling valve for supplying sample slugs to the columns of a chromatographic analyzer.

It is another object to provide a valve which can withstand operation at high temperatures and under corrosive conditions.

It is a still further object to provide a valve which can undergo a great number of cycles of operation without failure or the needing of replacements for working parts.

Further objects and advantages of this invention will become apparent to those skilled in the art from a study of the accompanying disclosure, appended claims, and drawing, in which:

Figure 1:
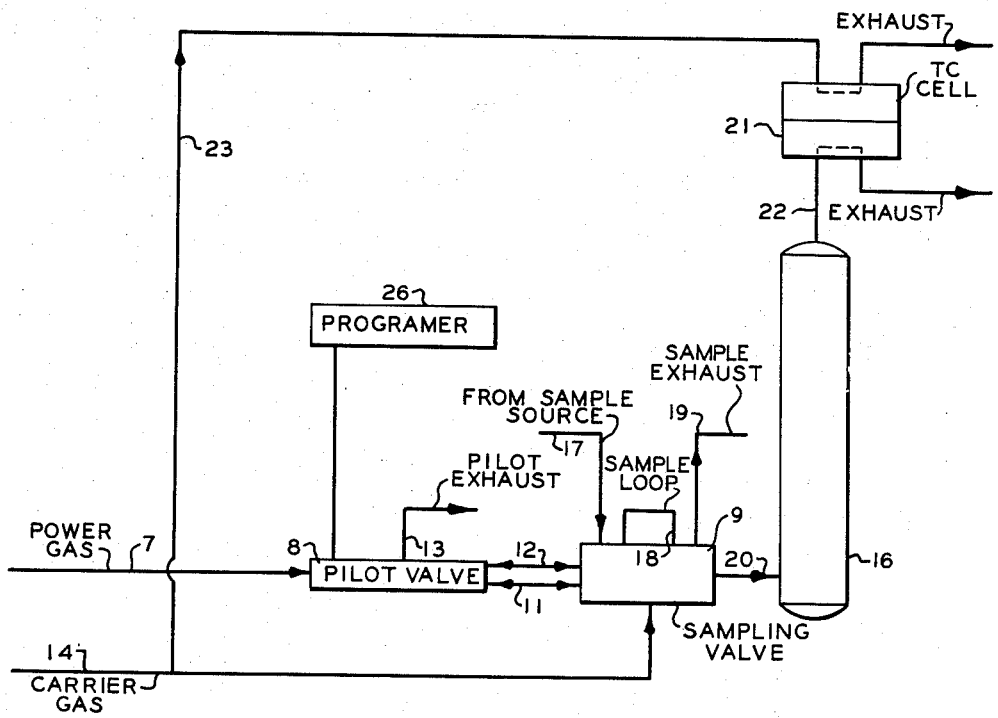
FIGURE 1 is a simplified flow sheet of a chromatographic analyzer in which the fluid-actuated valve of this invention is used as the sampling valve.

Reference is now made to the drawing in detail, wherein like parts have been designated by like reference numerals, and to FIGURE 1 in particular, wherein a power gas, such as air, passes via conduit 7 to pilot valve 8 wherein the gas stream is directed to a first side of a pneumatically-actuated diaphragm sampling valve 9 via conduit 11. The second side of sampling valve 9 is vented via conduit 12, pilot valve 8 and pilot exhaust conduit 13. A carrier gas, such as helium or hydrogen, is passed via conduit 14 and sampling valve 9 through column 16. A gas sample, introduced to sampling valve 9 via conduit 17 is being circulated through the sample loop of sampling valve 9 and vented via sample exhaust conduit 19. Periodically, the sample is passed along with the carrier gas, via conduit 20, to sorption column 16 where constituents of the sample to be identified and measured are absorbed or adsorbed, depending upon the nature of the contact material, and are then selectively desorbed by a continuing flow of carrier gas therethrough.

The sorption column effluent passes through an analyzer, indicated as thermal conductivity cell 21, via conduit 22. The output signal from TC cell 21 is passed to a recording instrument (not shown) which can be a conventional strip chart recorder. A stream carrier gas is passed via conduit 23 from conduit 14 through detector 21 so as to balance out the effect of the carrier gas in the column 16 effluent. The sample gas to be analyzed generally flows continuously through conduit 17 and this gas, also when a slug thereof is selected for analysis, is exhuasted from sampling valve 9 via conduit 19. Pilot valve 8 is actuated by programmer 26 which can be operated by a time cycle or other means. For a detailed discussion of the design and manner of operation of a typical pilot valve to be used in conjunction with this invention, see the co-pending application of Emmerich Guenther, Serial Number 858,997, filed December 11, 1959.

When pilot valve 8 is changed from the first described position, power gas is now directed to the second side of diaphragm valve 9 via conduit 12 and the carrier gas now passes to sample loop 18 collecting the sample trapped therein and carrying the same to column 16 via conduit 20. Meanwhile, the first side of sampling valve 9 is vented via conduit 11, pilot valve 8 and pilot exhaust conduit 13. Thus, each time pilot valve 8 is switched a measured sample is passed via conduit 20 through column 16 for analysis.

Figure 2:
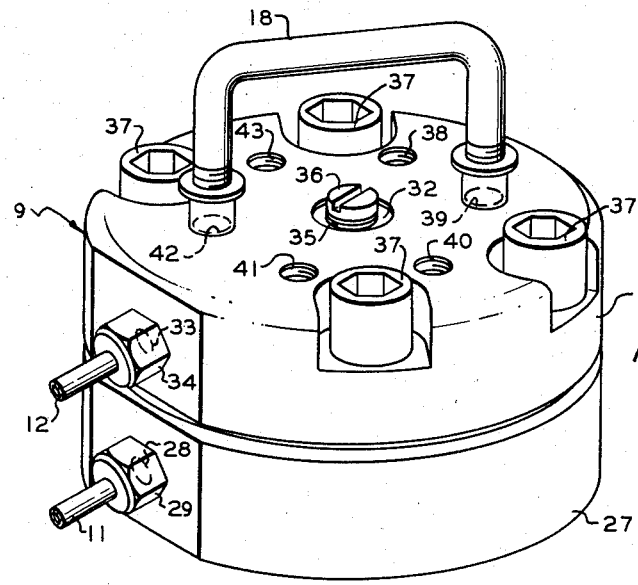
FIGURE 2 is a perspective view of an assembled, fluid-actuated sampling valve of this invention.

In FIGURE 2, there is shown a perspective view of the assembled fluid-actuated sampling valve, generally designated 9, of this invention. Sampling valve 9 comprises a lower first block 27 having a centrally disposed, generally cylindrical, vertical chamber therein (not shown). Block 27 is provided with a threaded, generally horizontal, first passage 28 extending between a region external of block 27 and the central vertical chamber. An inlet nut 29 is threadedly mounted in the external end of passage 28. Inlet nut 29 is adapted to receive conduit 11 from pilot valve 8 (shown in FIGURE 1).

An upper block 31 is spaced from lower block 27 by a disc, two diaphragms, and two gaskets (not shown). Block 31 is provided with a generally cylindrical, threaded vertical chamber 32, centrally disposed therein. Block 31 is also provided with a generally horizontal threaded passage 33 extending between the region external to block 31 and central chamber 32. Passageway 33 is provided threadedly mounted inlet nut 34. Inlet nut 34 is provided with tubing 12 from pilot valve 8. Central chamber 32 is sealed at its upper end with gasket 35 and threaded screw 36. Upper block 31 is fastened to lower block 27 by a plurality of bolts 37, such as Allen screws. Block 31 is further provided with a set of six vertical passages 38 through 43 disposed circumferentially about central chamber 32. Threaded passages 38 to 43 communicate between the upper and lower surfaces of upper block 31. Sample loop 18 of FIGURE 1 communicates between vertical passages 39 and 42.

Figure 3:
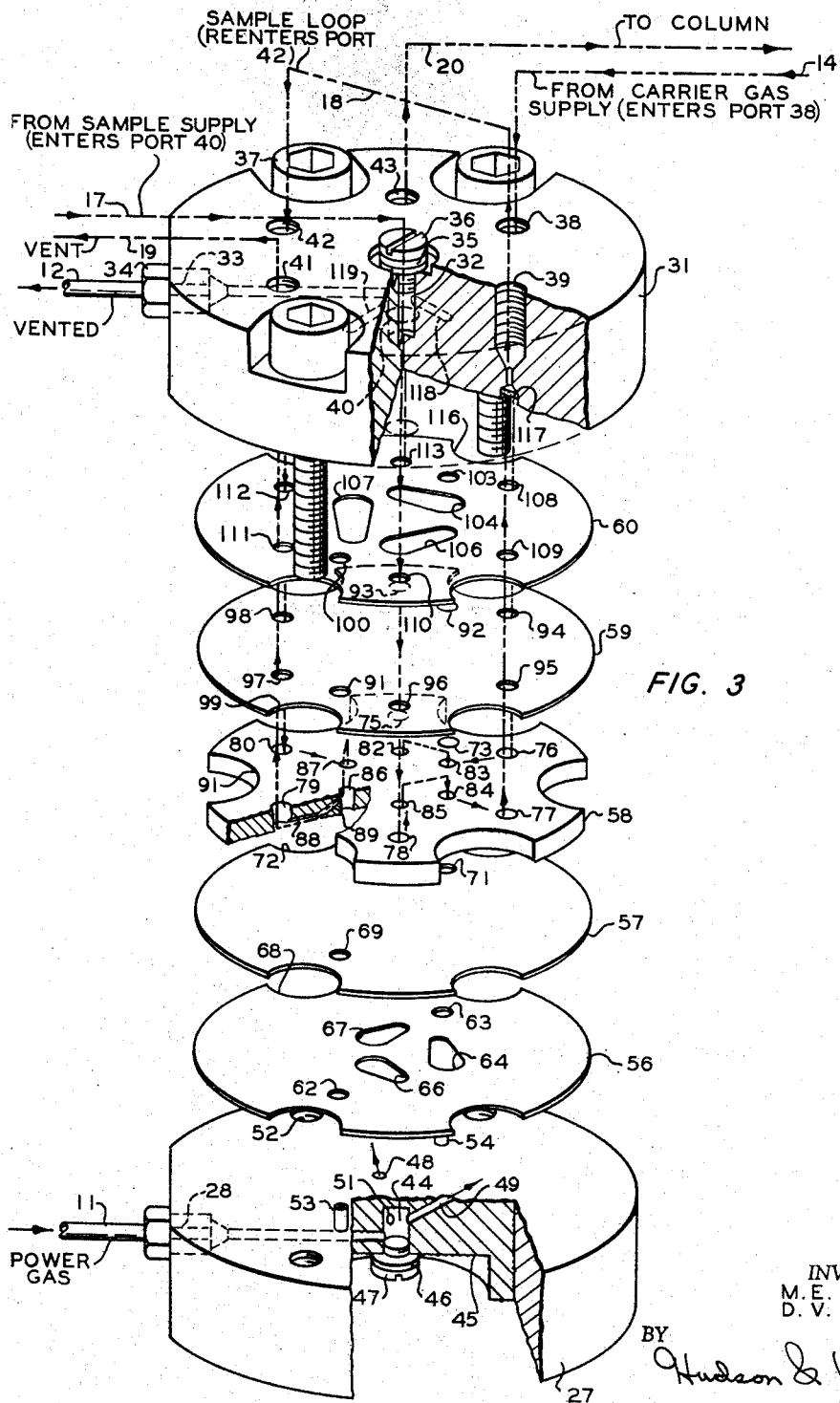
FIGURE 3 is an exploded perspective view of the components of the sampling valve of this invention, spaced and arranged in the order of their assembly with one position of operation indicated.

Referring now to FIGURE 3, in lower block 27 is found a central, generally cylindrical, vertical chamber 44 which communicates between the lower surface thereof and a point intermediate the upper and lower surfaces of block 27. The bottom surface of block 27 is provided with a central counter bore 45. Chamber 44 is sealed with washer 46 and threaded bolt 47 at its lower end within bore 45. Chamber 44 is also provided with three inclined passages 48, 49 and 51 communicating between the upper portion of chamber 44 and the upper surface of block 27. Block 27 is provided with a plurality of threaded bores near its periphery, such as 52, adapted to receive Allen screws 37.

Lower block 27 is also provided with a pair of spaced lugs 53 and 54, which are affixed to the upper surface thereof. Lugs 53 and 54 are adapted to receive lower gasket 56, lower diaphragm 57, circular disc 58, upper diaphragm 59, upper gasket 60 and upper block 31 thereon, and retain them in a prescribed position.

Lower gasket 56, preferably composed of a thermosetting plastic which is chemically inert and heat-resistant such as Kel-F (a polymer of chlorotrifluoroethylene), is provided with a pair of perforations 62 and 63 adapted to receive therethrough lugs 53 and 54 of block 27. Gasket 56 is further provided with three spaced tapered slots 64, 66 and 67 which are disposed end to end and are adjacent to the external ends of passages 48, 49 and 51 in the upper surface of block 27. Gasket 56 is also provided with a plurality of notches, such as 68, spaced around its perimeter, which are adjacent to threaded bores 52 of block 27, and are adapted to permit passage therethrough of Allen screws 37.

Lower diaphragm 57, preferably composed of a thin flexible chemically-inert, and heat-resistant plastic, such as Mylar (a polyester film) is provided with a pair of perforations 69 and 71 adapted to receive therethrough lugs 53 and 54 of block 27. Lower diaphragm 57 is further provided with a plurality of spaced notches, such as 72, around its perimeter, which are adjacent to notches 68 in gasket 56.

Generally circular, central disc 58, preferably composed of a chemically-resistant metal, such as stainless steel, is provided with a pair of perforations, one of which is 73, which are adapted to receive therethrough lugs 53 and 54 of lower block 27. Central disc 58 is also provided with a first outer set of six perforations, 75, 76, 77, 78, 79 and 80, which are circumferentially disposed near the periphery of disc 58. Each such perforation defines an upper port and a lower port in the upper and lower faces of disc 58, respectively. A second inner set of six perforations, 82, 83, 84, 85, 86 and 87, are circumferentially disposed about the center of disc 58 and are located on the six radii connecting the disc center with said first outer set of perforations. Similarly, each such perforation defines an upper and lower port in the disc faces. A set of six channels, such as 88, are located on the lower surface of disc 58 along the radii from the first outer set, 75 to 80, to a point intermediate the first and second sets of perforations. A set of six passages, such as 89, communicate between the inner ends of channels 88 and the inner set of disc perforations, 82 to 87. Disc 58 is further provided with a plurality of spaced notches such as 91, on its periphery. Notches 91 are adjacent to notches 68 in lower diaphragm 56.

Upper diaphragm 59, also preferably composed of a thin, flexible, chemically inert, and heat-resistant plastic such as Mylar, is provided with a pair of perforations, 91 and 92, adapted to receive therethrough lugs 53 and 54 of block 27. Diaphragm 59 is also provided with a set of six perforations 93, 94, 95, 96, 97 and 98, circumferentially disposed about the center of diaphragm 59 and located adjacent to the first outer set of perforations, 75 to 80, in central disc 58. Diaphragm 59 is further provided with a plurality of spaced notches, such as 99, on its periphery which are adjacent to notches 91 in disc 58.

Upper gasket 60 also preferably composed of a thermosetting chemically inert, and heat-resistant plastic such as Kel-F, is provided with a pair of perforations 100 and 103 adapted to receive therethrough lugs 53 and 54 of lower block 27. Upper gasket 60 is provided with three spaced slots 104, 106 and 107, disposed end to end, and circumferentially around the center of gasket 60. Gasket 60 is further provided with a set of six perforations, 108, 109, 110, 111, 112 and 113, circumferentially disposed near the periphery of gasekt 60, and adjacent to the set of perforations 93 to 98 in upper diaphragm 59. Gasket 60 is also provided with a plurality of spaced notches such as 116, on its periphery, which are adjacent to notches 99 in upper diaphragm 59.

Upper block 31 is provided with vertical passages 38, 39, 40, 41 42 and 43, which terminate at their lower end adjacent to the six perforations 108–113 in upper gasket 60, respectively. Passages 38 to 43 are counter bored at their lower ends to receive gas filters, such as 117, which are securely mounted therein. Passages 38–43 are also threaded at their upper ends to receive six threaded connecting nuts therein (not shown). These connecting nuts are adapted to receive suitable tubing (not shown) at their external ends. Upper block 31 is provided with three inclined passages 118, 119 and 121 (not seen) communicating between vertical chamber 32 and the lower surface of block 31. The external ends of passages 118, 119 and 121 are adjacent to slots 104, 106 and 107 in upper gasket 60.

In operation, when power gas flows to sampling valve 9 from pilot valve 8 via conduit 11, the flow path of carrier gas and sample gas through sampling valve 9 is shown in FIGURE 3. Carrier gas in conduit 14, under greater than atmospheric pressure, enters passage 38 of the sampling valve 9 passing downwardly through the adjacent perforations, 108 in upper gasket 60, and 94 in upper diaphragm 59, and into upper port 76 in central disc 58. Carrier gas then passes through the appropriate channel 88 and passage 89 in disc 58 between lower port 76 and lower port 83. Meanwhile, power gas from pilot valve 8, enters sampling valve 9 through passage 28, into chamber 44, and thence through inclined passages 48, 49 and 51, and slots 64, 66, and 67 in gasket 56, to seal diaphragm 57 against the lower surface of disc 58. Simultaneously, passage 33, chamber 32 and inclined passages 118, 119 and 121, all in block 31, are vented to the atmosphere through pilot valve 8, thereby exerting only atmospheric pressure against upper diaphragm 59 through slots 104, 106 and 107. Consequently, carrier gas passes out of upper port 83 above disc 58 and re-enters upper port 82, passing through channel 88 and passage 89 to lower port 75, thence upwardly out of upper port 75 through the adjacent perforations 93 in diaphragm 59, 113 in gasekt 60, and passage 43 in block 31, to sorption column 16 via conduit 20.

Concurrently, sample gas from conduit 17, under greater than atmospheric pressure, enters sampling valve 9 through passage 40 (not seen) in block 31, passes downwardly through the appropriate perforations, 110 in gasket 60, 96 in diaphragm 59, and enters upper port 78 in central disc 58. Sample gas then passes through the appropriate channel 88 and passage 89 between lower port 78 and lower port 85, and since lower diaphragm 57 is sealed against disc 58, as heretofore described, it passes above disc 58 and re-enters upper port 84. Sample gas then passes through passage 89 and channel 88 between lower port 84 and lower port 77, out of upper port 77 and upwardly through the appropriate perforations, 95 in diaphragm 59, 109 in gasket 60, through passage 39 in block 31, and into external sample loop 18. The sample slug in loop 18 re-enters sampling valve 9 through passage 42 in block 31, passes downwardly through the adjacent perforations, 112 in gasket 60, 98 in diaphragm 59 and enters upper port 80 in disc 58. It passes through the appropriate channel 88 and passage 89 to upper port 87, then above disc 58 and re-enters upper port 86. The sample flows through passage 89 and channel 88 to lower port 79, thence upwardly out of upper port 79 through the adjacent perforations, 97 in diaphragm 59, 111 in gasket 60, and through passage 41 in block 31 to vent through sample exhaust conduit 19.

Figure 4:
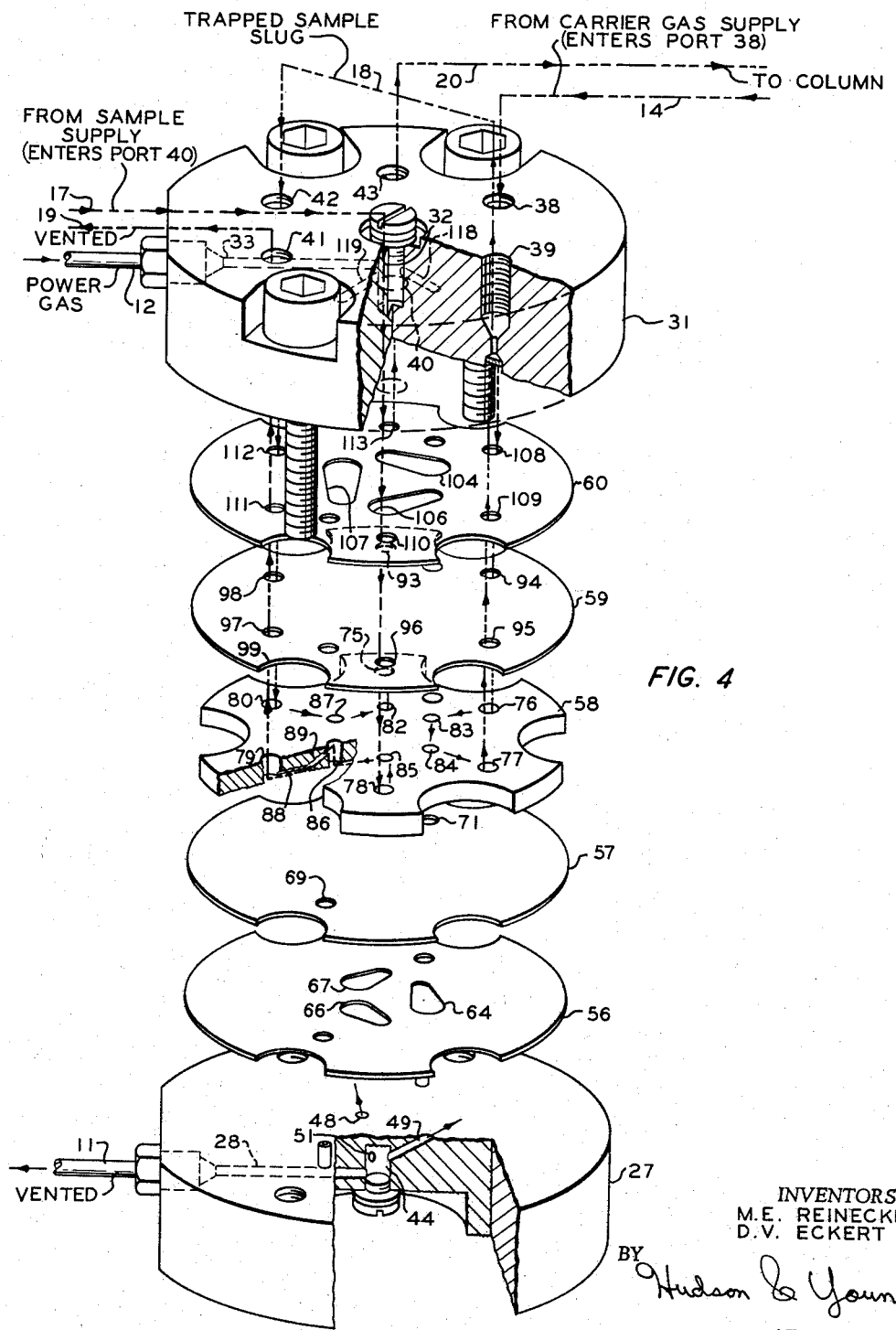
FIGURE 4 is another exploded perspective view of the valve of this invention indicating the alternate position of operation.

As shown in FIGURE 4, when pilot valve 8 switches position, as directed by programmer 26, power gas from pilot valve 8 now passes through conduit 12 through passage 33, into central chamber 32, diverges through inclined passages 118, 119 and 121 (not seen), and then through slots 104, 106 and 107 in upper gasket 60 to seal diaphragm 59 against the upper surface of central disc 58. Simultaneously, passage 28, central chamber 44 and inclined passages 48, 49 and 51, all in lower block 27 are vented to the atmosphere through pilot valve 8. Thus, only atmospheric pressure is exerted against lower diaphragm 57 through slots 64, 66 and 67 of lower gasket 56. Carrier gas from conduit 14 still enters passage 38 in block 31, passes downwardly through the adjacent perforations, 108 in upper gasket 60, 94 in upper diaphragm 59, into upper port 76 of central disc 58. It passes through the appropriate channel 88 and passage 89 between lower port 76 and lower port 83. Because upper diaphragm 59 is now sealed against disc 58, carrier gas passes thereunder to lower port 84 and through the appropriate passage 89 and channel 88 to lower port 77. Then it flows upwardly out of upper port 77 through the adjacent perforations, 95 in diaphragm 59, 109 in disc 60, through passage 39 in block 31, and into sample loop 18 driving the trapped sample slug therein before it. The carrier gas, with the sample slug ahead of it re-enters sampling valve 9 through passage 42 in upper block 31. It flows downwardly through the adjacent perforations, 112 in gasket 60, 98 in diaphragm 59, and enters upper port 80 in central disc 58. The gas then flows through the appropriate channel 88, passage 89 to lower port 87, thence below disc 58 over to lower port 82, back through the appropriate channel 88 and passage 89 to lower port 75. It then flows upwardly out of upper port 75 through the adjacent perforations, 93 in diaphragm 59, 113 in disc 60, through passage 43 in block 31, and thence to column 16 through conduit 20.

Meanwhile, sample gas is still entering sampling valve 9 through conduit 17 via passage 40 (not seen) in block 31. It passes downwardly through the adjacent perforation, 110 in upper gasket 60, through perforation 96, and upper diaphragm 59 and into upper port 78 in disc 58. The gas passes through the appropriate channel 88 and passage 89 to lower port 85, from there below disc 58 to lower port 86, back through passage 89 and channel 88 to lower port 79. Sample gas then passes upwardly out of upper port 79 through the adjacent perforations, 97 in diaphragm 59, 111 in gasket 60, through passage 41 in block 31, out of sampling valve 9 through sample exhaust conduit 19 to vent.

When pilot valve 8 is once more switched, the diaphragms 57 and 59 in valve 9 will reverse position, and the path of flow for carrier and sample gas, as described in connection with FIGURE 3, will be restored. The frequency with which a sample slug is passed to column 16 is determined by the operation of pilot valve 8, controlled through programmer 26.

Although the valve is described as applied to a chromatographic analyzer, it is not limited thereto, but can be employed in any situation where a fluid actuated diaphragm valve is indicated. Reasonable variations and modifications are possible within the scope of this disclosure without departing from the spirit and scope of the invention.

That which is claimed is:

1. A two-position fluid-actuated diaphragm valve comprising, in combination: a central disc; a first outer set of six spaced perforations disposed near the periphery of said disc; a second inner set of six spaced perforations disposed within the circle described by said first set of spaced perforations; each of said perforations defining an upper and lower pair of ports in the faces of said disc; a plurality of passages in said disc connecting radially aligned perforations of said first and second sets of perforations; a first and second diaphragm means disposed on opposing sides of said disc, the upper of said diaphragm means provided with a set of spaced perforations disposed adjacent said first set of spaced perforations in said central disc; a first and second gasket means disposed adjacent said first and second diaphragm means, respectively; said first and second gasket means being each provided with a plurality of slots for receiving therein the adjacent portions of said first and second diaphragm means; said slots in said first gasket means being disposed so that the first of said slots extends over the upper ports of the first and second inner disc perforations, the second of said slots extends over the upper ports of said third and fourth inner disc perforations, and the third of said slots extends over the upper ports of said fifth and sixth inner disc perforations; said second gasket means being so disposed that the first of said slots thereof extends over the lower ports of said second and third inner disc perforations, the second of said slots extends over the lower ports of said fourth and fifth inner disc perforations, and the third of said slots extends over the lower ports of said sixth and first inner disc perforations; the upper of said gasket means further provided with a set of spaced perforations disposed adjacent said set of perforations in said upper diaphragm means; a first and second passage means for conducting a power gas from a source thereof to the respective pluralities of slots in said first and second gasket means, and sealing said adjacent portions of said diaphragm means against said central disc, thereby closing off communication between certain of the adjacent members of said inner second set of spaced perforations, as desired; a third passage means for conducting a carrier gas from a source thereof to one of said first set of spaced perforations; a fourth passage means for conducting vaporized sample from a source thereof to a second of said first set of spaced perforations; a sample conduit communicating between a third and fourth perforations of said first set; a fifth passage means for venting sample gas from a fifth of said first set of spaced perforations; and sixth passage means for conducting carrier gas and vaporized sample to a chromatographic column from a sixth of said first set.

2. A two-position fluid-actuated diaphragm valve comprising, in combination: a central disc; a first outer set of six spaced perforations disposed near the periphery of said disc; a second inner set of six spaced perforations disposed within the circle described by said first set of spaced perforations; each of said perforations defining an upper and lower pair of ports in the faces of said disc; six passages in said disc connecting radially aligned pairs of perforations of said first and second sets of perforations; a first diaphragm means disposed on the upper side of said disc; said first diaphragm means provided with a set of six spaced perforations disposed adjacent to said outer set of spaced perforations in said central disc; a first gasket means disposed adjacent and above said first diaphragm means, said first gasket means provided with a first set of three slots disposed end to end for receiving therein the adacent portions of said diaphagm means; said first gasket means further disposed so that the first of said slots extends over the upper ports of said first and second inner disc perforations, the second of said slots extends over the upper ports of said third and fourth inner disc perforations, and the third of said slots extends over the upper ports of said fifth and sixth inner disc perforations; said first gasket means further provided with a set of six spaced perforations disposed adjacent to said set of six perforations in said first diaphragm means; a second diaphragm means disposed adjacent and on the lower side of said disc; a second gasket means disposed adjacent and below said second diaphragm means; said second gasket means provided with a second set of three slots disposed end to end for receiving therein adjacent portions of said second diaphragm means; said second gasket means further disposed so that the first of said slots therein extends over the lower ports of said second and third inner disc perforations, the second of said slots extends over the fourth and fifth said inner disc perforations, and the third of said slots extends over the lower portion of said sixth and first inner disc perforations; a first passage means for conducting a power gas from a source thereof to said first set of three slots and sealing the adjacent portions of said first diaphragm means against the upper surface of said central disc; a second passage means for conducting power gas from said power gas source to said second set of three slots and sealing the adjacent portions of said second diaphragm means against the lower surface of said central disc; said first and second diaphragm means thereby closing off communication between certain of the adjacent members of said second inner set of spaced perforations in said central disc, as desired, a third passage means for conducting carrier gas from a source thereof to one perforation of said first outer set; a fourth passage means for conducting vaporized sample from a source thereof to a second perforation of said first outer set; a sample conduit communicating between a third and fourth perforations of said first outer set; a fifth passage means for venting sample gas from a fifth perforation of said first outer set; and a sixth passage means for conducting carrier gas and a sample slug to a chromatographic column from a sixth perforation of said outer set.

3. A two-position, fluid-actuated diaphragm valve comprising, in combination: a lower first block having a first chamber therein; said first block having a first passage therein extending between said first chamber and a region exterior of said first block; the external end of said first passage adapted to receive a first conduit from a power gas source; said first block provided with second, third and fourth passages diverging from said first chamber to the upper horizontal surface of said first block; a first and second spaced lugs affixed to said upper horizontal surface of said first block; said first block provided with a plurality of bores threaded to receive a plurality of fastening screws; a lower first plastic gasket provided with two perforations positioned to receive therethrough said first and second lugs and abutting and fastened to said first block thereby; said first gasket provided with a first set of three spaced slots disposed end to end and adjacent to the external ends of said second, third, and fourth passages; said first gasket further provided with a plurality of notches spaced around its perimeter and adjacent said threaded bores in said first block to permit passage therethrough of said fastening screws; a thin, flexible, lower first diaphragm adjacent and in sealing contact with said first gasket; said first diaphragm provided with a pair of perforations positioned to receive therethrough said first and second lugs; said first diaphragm further provided with a plurality of spaced notches around its perimeter and adjacent said notches in said first gasket; a circular metal disc provided with two perforations adapted to receive therethrough said first and second lugs and adjacent and in sealing contact with said first lower diaphragm thereby a first outer set of six perforations circumferentially disposed near the periphery of said disc; a second inner set of six perforations circumferentially disposed about the mid-point of said disc and located on radii connecting said mid-point with said first outer set of perforations; a set of six channels on the lower surface of said disc located along said radii between said first outer set of perforations and a point intermediate said first and second sets; a set of six passages within said disc communicating between said second set of perforations and the inner ends of said six channels; said disc also provided with a plurality of spaced notches on its periphery and adjacent to said notches in said first lower diaphragm; a thin flexible upper second diaphragm adjacent and in sealing contact with said circular disc; said second diaphragm provided with a pair of perforations adapted to receive therethrough said first and second lugs; said second diaphragm also provided with a set of six perforations adjacent said first outer set of perforations in said metal disc; said second diaphragm further provided with a plurality of spaced notches on its periphery and adjacent said notches in said metal disc; an upper second plastic gasket adjacent and in sealing contact with said second diaphragm; said second gasket provided with a second set of three spaced slots disposed end to end and alternately to the position of said first set of spaced slots; said first gasket further disposed so that the first of said spaced slots extends over the lower ports of said second and third inner disc perforations, the second of said spaced slots extends over the lower portion of said fourth and fifth inner disc perforations and the third of said spaced slots extends over the lower ports of said sixth and first inner disc perforations; said second gasket further disposed so that the first slot thereof extends over the upper ports of said first and second inner disc perforations, the second spaced slot thereof extends over the third and fourth inner disc perforations, and the third spaced slot extends over the fifth and sixth inner disc perforations; said second gasket further provided with a set of six perforations adjacent said set of perforations in said second diaphragm; said second gasket further provided with two perforations positioned to receive therethrough said first and second lugs; said second gasket also provided with a plurality of spaced notches on its periphery and adjacent said notches in said second diaphragm; a set of six gas filters; an upper second block having a second chamber therein; a set of six vertical passages communicating between the upper and lower sides of said second block; said vertical passages at their lower end terminating adjacent said set of six perforations in said second gasket; said vertical passages being counterbored at their lower ends to receive said gas filters securably mounted therein; said vertical passages at the upper ends thereof being adapted to receive conduit means at the the external ends thereof; a seventh passage extending between a region external of said block and said central second chamber thereof; the external end of said seventh passage being adapted to receive a second conduit from said external power gas source; said second block provided with an eighth, ninth, and tenth passages diverging from said second chamber to the lower horizontal surface of said second block and terminating adjacent said second set of slots in said upper second gasket; said second block further provided with a plurality of threaded bores near its periphery adapted to receive said plurality of fastening screws; said screws being adapted to hermetically seal said upper second block to said lower first block; one of said vertical passages in communication with a source of carrier gas; a second of said vertical passages in communication with a source of vaporized sample; a third conduit communicating between a third and fourth of said vertical passages; a fifth of said vertical passages in communication with an exhaust means for said vaporized samples; and the sixth of said vertical passages in communication with a chromatographic column for conducting carrier gas and vaporized sample thereto.

References Cited in the file of this patent
UNITED STATES PATENTS

| | | |
|---|---|---|
| 2,833,151 | Harvey | May 6, 1958 |
| 2,865,402 | Miller | Dec. 23, 1958 |

OTHER REFERENCES

Gas Chromatography, by D. H. Desty, published in London by Butterworths Scientific Publications in 1958, pp. 288–299 relied on. (Copy in Div. 36.)